(12) United States Patent
Murakami (10) Patent No.: US 11,947,639 B2
(45) Date of Patent: Apr. 2, 2024

(54) COMPUTER READABLE MEDIUM STORING DISPLAY CONTROL PROGRAM AND DISPLAY CONTROL METHOD

(71) Applicant: DENSO TEN Limited, Kobe (JP)

(72) Inventor: Kazuo Murakami, Kobe (JP)

(73) Assignee: DENSO TEN Limited, Kobe (JP)

( * ) Notice: Subject to any disclaimer, the term of this patent is extended or adjusted under 35 U.S.C. 154(b) by 384 days.

(21) Appl. No.: 17/009,894

(22) Filed: Sep. 2, 2020

(65) Prior Publication Data

US 2021/0097155 A1    Apr. 1, 2021

(30) Foreign Application Priority Data

Sep. 26, 2019 (JP) ................... 2019-175664

(51) Int. Cl.
*G06F 21/31* (2013.01)
*G06F 3/14* (2006.01)

(52) U.S. Cl.
CPC ............. *G06F 21/31* (2013.01); *G06F 3/14* (2013.01)

(58) Field of Classification Search
CPC .. G06F 21/31; G06F 3/14; G06F 12/14; G06F 17/60; G06F 21/6245; G09G 2354/00; G09G 2358/00
USPC ............................................................ 726/7
See application file for complete search history.

(56) References Cited

U.S. PATENT DOCUMENTS

| | | | |
|---|---|---|---|
| 9,280,646 B1* | 3/2016 | Nandyalam | G06F 21/6218 |
| 9,727,933 B1* | 8/2017 | Smith | G06Q 10/10 |
| 9,817,952 B2* | 11/2017 | Cholas | G06Q 30/0633 |
| 2003/0182357 A1* | 9/2003 | Chess | G06F 16/9574 |
| | | | 709/230 |
| 2007/0113179 A1* | 5/2007 | Gibbs | G06F 16/9577 |
| | | | 707/E17.121 |
| 2007/0204222 A1* | 8/2007 | Rogan | G06F 16/957 |
| | | | 707/E17.119 |
| 2010/0332587 A1* | 12/2010 | Schwimer | G06F 16/972 |
| | | | 711/E12.017 |
| 2011/0107404 A1* | 5/2011 | Ramsdell | H04L 12/1403 |
| | | | 726/5 |
| 2013/0024909 A1* | 1/2013 | Morita | H04L 63/102 |
| | | | 726/1 |
| 2013/0054720 A1* | 2/2013 | Kang | G06Q 50/01 |
| | | | 709/204 |
| 2013/0080471 A1* | 3/2013 | Forte | G06F 21/6218 |
| | | | 707/785 |
| 2013/0283350 A1* | 10/2013 | Afek | G06F 21/6218 |
| | | | 726/4 |

(Continued)

FOREIGN PATENT DOCUMENTS

| | | |
|---|---|---|
| JP | 2003-122643 A | 4/2003 |
| JP | 2009-123062 A | 6/2009 |
| JP | 2015-162235 A | 9/2015 |

*Primary Examiner* — Kambiz Zand
*Assistant Examiner* — Aubrey H Wyszynski
(74) *Attorney, Agent, or Firm* — Oliff PLC (57) ABSTRACT

The invention is directed to a computer readable medium storing a display control program for causing a computer to execute: a setting procedure of setting display control information of protected content to be protected based on authentication information; and a determination procedure of determining whether to permit display of the protected content and whether to cancel an authenticated state of the protected content based on the display control information set by the setting procedure.

4 Claims, 5 Drawing Sheets

(56) References Cited

U.S. PATENT DOCUMENTS

| | | | | |
|---|---|---|---|---|
| 2014/0310803 | A1* | 10/2014 | Irie | G06F 21/32 |
| | | | | 726/19 |
| 2014/0365911 | A1* | 12/2014 | Smith | G06F 16/9577 |
| | | | | 715/747 |
| 2015/0009279 | A1* | 1/2015 | Vijayakumar | H04N 7/152 |
| | | | | 348/14.09 |
| 2015/0172267 | A1* | 6/2015 | Sato | H04L 63/0815 |
| | | | | 726/3 |
| 2016/0105400 | A1* | 4/2016 | Straub | H04L 63/0464 |
| | | | | 713/168 |
| 2016/0335419 | A1* | 11/2016 | Cholas | G06F 21/10 |
| 2018/0351922 | A1* | 12/2018 | Hybertson | H04L 63/0464 |
| 2019/0375294 | A1* | 12/2019 | Wataya | B60K 26/04 |
| 2021/0235362 | A1* | 7/2021 | Boliek | H04W 24/02 |

\* cited by examiner

| CONDITION | DETERMINATION RESULT |
|---|---|
| (1) A PREDETERMINED URL PARAMETER EXISTS IN URL WHEN PROTECTED CONTENT C IS ACQUIRED? | |
| (2) WITHIN A PREDETERMINED TIME SINCE PREVIOUS PROTECTED CONTENT C IS ACQUIRED? | |
| (3) AN AUTHENTICATED STATE IS BEING CONTINUED? | |

COMPUTER READABLE MEDIUM STORING DISPLAY CONTROL PROGRAM AND DISPLAY CONTROL METHOD

CROSS-REFERENCE TO RELATED APPLICATIONS

This application is based on and claims priority under 35 USC 119 from Japanese Patent Application No. 2019-175664 filed on Sep. 26, 2019.

TECHNICAL FIELD

The present invention relates to a non-transitory computer readable medium storing a display control program and a display control method.

BACKGROUND ART

Conventionally, there is a technology for protecting content acquired via the Internet using basic authentication. As such a technique, there is one for improving security by combining the basic authentication with other authentication information such as position information (for example, see JP-A-2015-162235).

SUMMARY OF INVENTION

The conventional art does not consider about a protection of the content after passing the authentication. For example, when a user different from the authenticated user uses the same terminal after passing the authentication for the content, the content may be visually recognized by the user who originally does not have access right.

The present invention has been made in view of the above, and an object thereof is to provide a display control program and a display control method capable of appropriately protecting content.

In order to solve the above problem and to achieve the object, in the present invention, a computer is caused to execute: a setting procedure for setting display control information of protected content C to be protected based on authentication information, and a determination procedure for determining whether to permit display of the protected content and whether to cancel an authenticated state of the protected content based on the display control information set by the setting procedure.

According to the present invention, the content can be appropriately protected.

DETAILED DESCRIPTION OF THE INVENTION

Hereinafter, a display control program and a display control method according to an embodiment will be described with reference to the accompanying drawings. The present invention is not limited to the following embodiments.

Figure 1A:
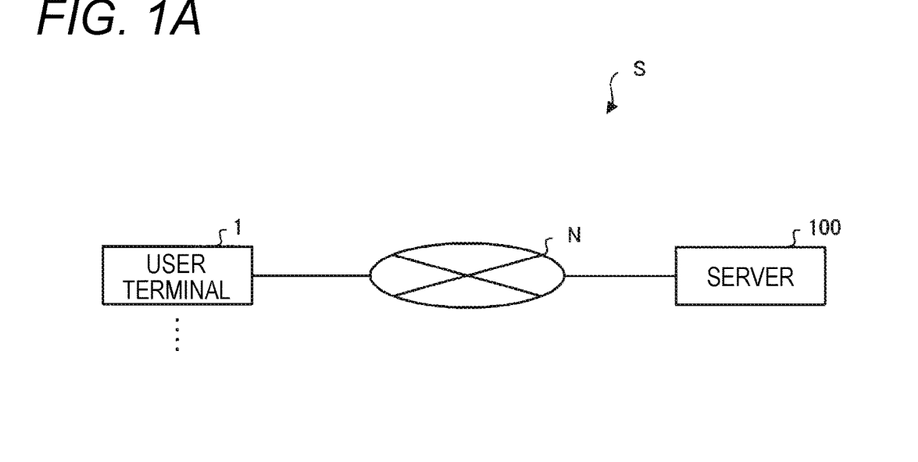
FIG. 1A is a diagram showing a configuration example of a display control system.
Figure 1B:
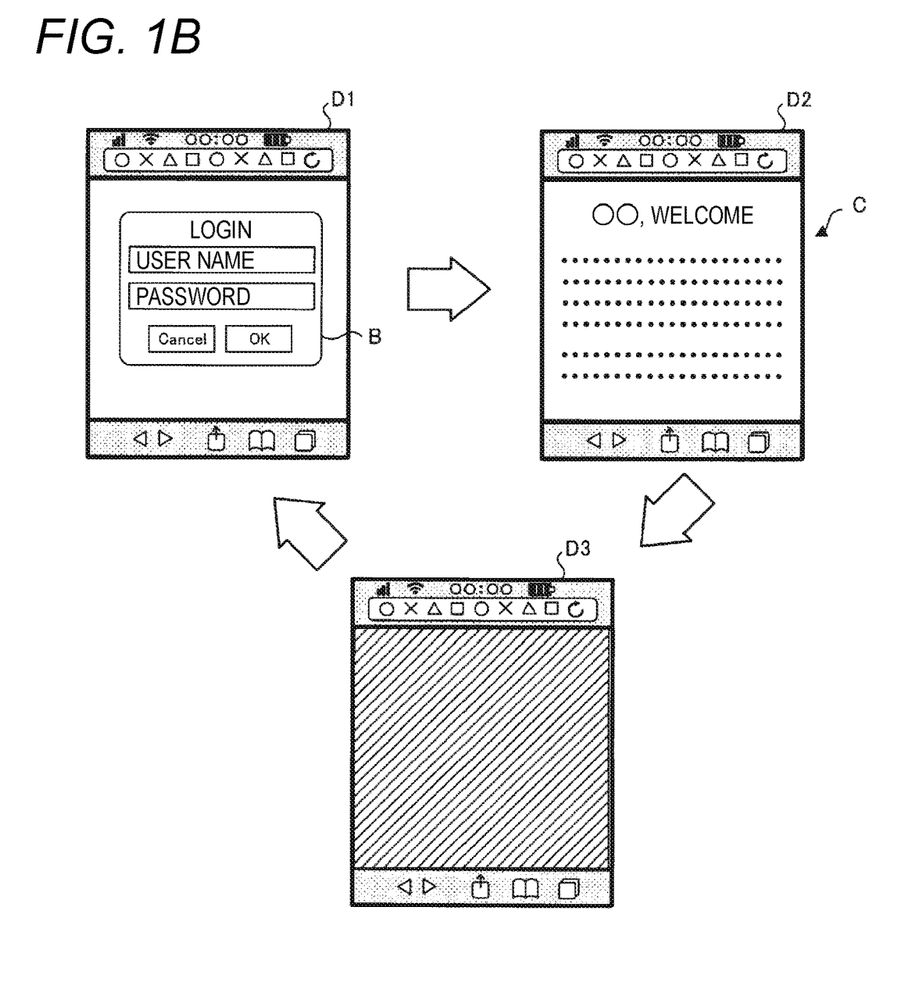
FIG. 1B is a diagram showing an outline of a display control program.

First, the display control program and an outline of the display control method according to the embodiment will be described with reference to FIGS. 1A and 1B. FIG. 1A is a diagram showing a configuration example of the display control system. FIG. 1B is a diagram showing the outline of the display control program. In the following description, a case where a user terminal executes the display control program will be described as an example.

As shown in FIG. 1A, a display control system S according to the embodiment includes a plurality of user terminals 1 and a server 100. The user terminal 1 is a terminal used by a user. The user terminal 1 includes a desktop personal computer (PC), a notebook PC, a tablet terminal, a mobile phone, a personal digital assistant (PDA) and the like.

The server 100 is a web server that provides various contents to the user via the user terminal 1. As shown in FIG. 1A, the user terminal 1 and the server 100 are connected via a network N so as to be able to communicate with each other in a wired or wireless manner. The network N is a communication network such as a local area network (LAN), a wide area network (WAN), a telephone network (such as a mobile phone network or a fixed telephone network), a local Internet Protocol (IP) network or the Internet.

For example, the server 100 publishes content in hyper text markup language (HTML) format on the network N, and provides the content to the user terminal 1 based on a request from the user terminal 1.

In the present embodiment, the server 100 provides the content only to a specific user by protecting the content by basic authentication. The basic authentication is one of authentication methods defined by hyper text transfer protocol (HTTP).

Conventionally, when a user (a third party) different from a user who has performed the basic authentication operates the same user terminal after the user terminal acquires content from the server, the protected content may be browsed by the third party. Therefore, in the conventional art, there is room for improvement in protecting the content.

Therefore, the display control program according to the embodiment sets display control information of the content, permits display of the content based on the display control information, and cancels an authenticated state of the content (deauthorizes the content) based on the display control information. Hereinafter, the content protected by the basic authentication will be described as protected content C.

For example, when the user terminal 1 transmits an acquisition request for the protected content C to the server 100, the server 100 responds that authentication is necessary. Based on a response from the server 100, the user terminal 1 displays an authentication dialog B shown on a display screen D1 in FIG. 1B, and receives an input of a user name and a password.

The user terminal 1 transmits authentication information such as the input user name and password to the server 100, thereby performing the authentication on a server 100 side. When the authentication is passed, the server 100 is allowed to display the protected content C on the user terminal 1.

Here, the server 100 sets the protected content C so as to be hidden (not displayed) by default in the user terminal 1, and imparts JavaScript (registered trademark) as the display control program according to the present embodiment to HTML of the protected content C and transmits it to the user terminal 1.

A browser of the user terminal 1 operates the display control program according to the embodiment based on the JavaScript. Hereinafter, an operation of the JavaScript executed by the browser of the user terminal 1 may be described as an operation of the user terminal 1.

Upon receiving the protected content C, the user terminal 1 determines whether to permit the display of the protected content C based on display control information of the protected content C. The display control information is information indicating whether to permit the display of the protected content C.

As will be described in detail below, since the display control information is not set in a first access, it is determined that the display of the protected content C is not permitted. In such a case, the user terminal 1 newly sets the display control information and then rereads the protected content C.

Thereby, after the rereading, the user terminal 1 determines to permit the display of the protected content C based on the newly set display control information. Then, the user terminal 1 switches the protected content C set to a hiding state to a displayed state. Thereby, the user terminal 1 transits to a display screen D2 on which the protected content C is displayed.

When a display screen of the user terminal 1 transits from the display screen D2 to the display screen D2 of the protected content C again via a display screen D3 other than the protected content C based on the operation of the user, the user terminal 1 determines again whether to permit the display of the protected content C.

When determining to permit the display of the protected content C, the user terminal 1 displays the protected content C, and when determining not to permit the display of the protected content C, the user terminal 1 cancels an authenticated state of the protected content C.

The user terminal 1 rereads the protected content C after cancelling the authenticated state of the protected content C, so that the protected content C is not displayed and the display screen D1 is displayed.

In this way, the display control program according to the embodiment sets the display control information of the protected content C, determines whether to display the protected content C and whether to cancel the authenticated state of the protected content C based on the display control information.

In the display control program according to the embodiment, when it is determined not to display the protected content C or to cancel the authenticated state of the protected content, the display screen D2 of the protected content C is not displayed.

Therefore, according to the display program according to the embodiment, since browsing of the protected content C by the third party can be prevented, the content can be appropriately protected.

Figure 2:
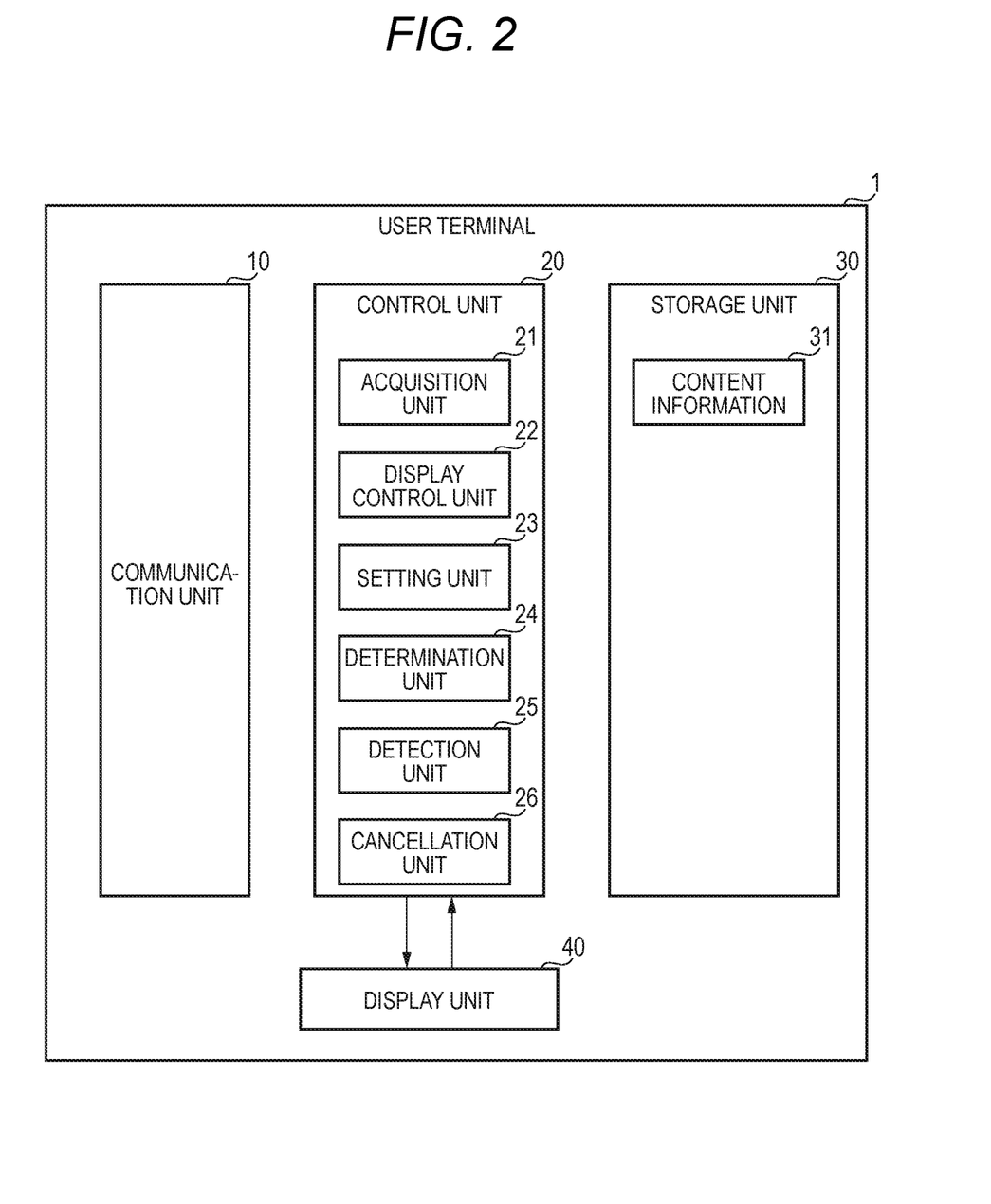
FIG. 2 is a block diagram of a user terminal.

Next, a configuration example of the user terminal 1 according to the embodiment will be described with reference to FIG. 2. FIG. 2 is a diagram showing the configuration example of the user terminal 1. As shown in FIG. 2, the user terminal 1 according to the embodiment includes a communication unit 10, a control unit 20, a storage unit 30 and a display unit 40.

The communication unit 10 is a communication interface that is wirelessly connected to a specific network, and transmits and receives information to and from the server 100 via the network N. The control unit 20 includes an acquisition unit 21, a display control unit 22, a setting unit 23, a determination unit 24, a detection unit 25 and a cancellation unit 26. The storage unit 30 stores content information 31.

Here, the user terminal 1 encompasses, for example, a computer including a central processing unit (CPU), a read only memory (ROM), a random access memory (RAM), a data flash and the like, and various circuits.

The CPU of the computer functions as the acquisition unit 21, the display control unit 22, the setting unit 23, the detection unit 25 and the cancellation unit 26 of the control unit 20 by interpreting and executing a program stored in the ROM and the HTML or JavaScript of the protected content C, for example.

The storage unit 30 corresponds to, for example, the RAM or the data flash. The RAM and the data flash can store the content information 31, information of various programs, and the like. The user terminal 1 may acquire the above program and various types of information via another computer or a portable recording medium connected via a wired or wireless network.

The content information 31 is information on the protected content C. More specifically, the content information 31 includes information such as HTML, JavaScript, cascading style sheets (CSS), uniform resource locator (URL), Cookie and the like related to the protected content C acquired from the server 100.

The control unit 20 permits the display of the protected content C and cancels a protection state of the protected content C based on the display control information of the protected content C described above.

The acquisition unit 21 acquires the protected content C from the server 100 and stores the acquired protected content C as the content information 31 in the storage unit 30.

The display control unit 22 reads the protected content C and outputs the read protected content C to the display unit 40, thereby displaying the protected content C on the display unit 40. The display control unit 22 displays the protected content C in a display mode defined by the CSS.

Here, in the CSS of the protected content C, a display attribute for hiding the content is set for the protected content C in an initial state. For example, "none" is set for a display style of a body element as the display attribute for hiding.

On the other hand, when the determination unit 24 described below determines to permit the display of the protected content C, the display control unit 22 sets the protected content C from the display attribute for hiding to a display attribute for display. For example, "block" is set for the display style of the body element as the display attribute for display.

Therefore, the display control unit 22 does not display the protected content C whose display is determined not to be permitted by the determination unit 24, and displays only the protected content C whose display is determined to be permitted. That is, in the present embodiment, since permission to display the protected content C is determined each time in order to display the protected content C, unintended display of the protected content C can be avoided, and the protected content C can be protected.

The setting unit 23 sets the display control information of the protected content C. The setting unit 23 sets a predetermined URL parameter, acquisition time of the protected content C and session information as the display control information. The display control information is recorded in the URL or Cookie of the protected content C, for example.

Specifically, when the protected content C is read, the setting unit 23 sets time information indicating time when the protected content C is read as the predetermined URL parameter. That is, by referring to the URL parameter, whether the predetermined URL parameter exists and the acquisition time of the protected content C can be identified.

The URL parameter is recorded by rewriting the reload URL during rereading, which is described in the HTML or JavaScript of the protected content C. A predetermined character string or the like may be added as the URL parameter together with the time information. The predetermined character string may be set so as to be always unique during rereading.

The setting unit 23 sets the session information indicating whether the authenticated state of the protected content C is continued. Specifically, the session information is set by setting a predetermined variable in the Cookie when the authentication passes and clearing the predetermined variable when the authentication is canceled.

The variable is, for example, a text unique to the user terminal 1, but a different text may be set for the variable each time. In addition, the Cookie in which the session information is recorded is preferably set as a volatile Cookie. Specifically, when the browser of the user terminal 1 is closed, content of the Cookie is automatically cleared.

Figure 3:
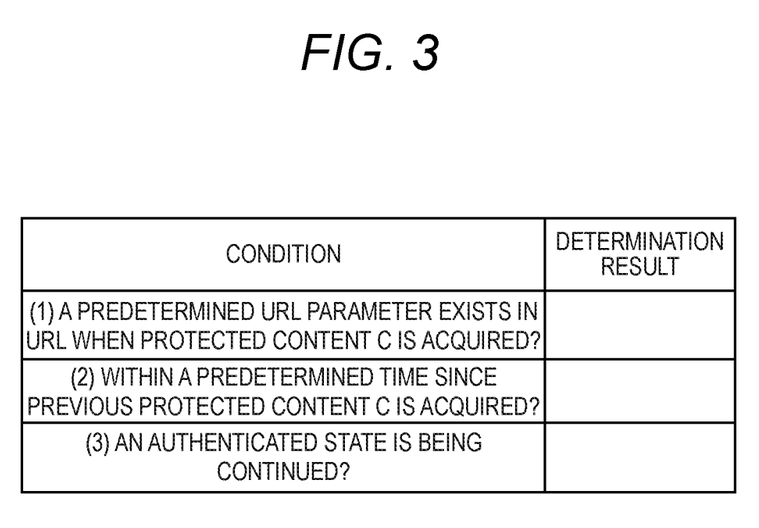
FIG. 3 is a diagram showing an example of check items.

The determination unit 24 determines whether to permit the display of the protected content C based on the display control information. When the display is not permitted, the determination unit 24 determines whether to cancel the authenticated state. FIG. 3 is a diagram showing a specific example of determination items of the determination unit 24.

As shown in FIG. 3, the determination unit 24 determines whether the following conditions (1) to (3) are satisfied or not based on the display control information.

(1) A predetermined URL parameter exists in URL by which protected content C is acquired?

(2) Within a predetermined time since the protected content C is previously acquired?

(3) An authenticated state is being continued?

First, the determination unit 24 acquires the URL parameter as the display control information. The URL parameter is acquired from the URL when the protected content C is acquired. The determination unit 24 acquires the session information as the display control information with reference to the Cookie.

Next, as a condition (1), the determination unit 24 evaluates whether the URL parameter matches a predetermined format, and determines whether the URL parameter exists. Specifically, the predetermined format is determined based on whether the URL parameter including the time information can be acquired in the predetermined format. The determination unit 24 may also determine when the setting unit 23 sets additional information such as the predetermined character string in addition to the URL parameter.

Next, as a condition (2), the determination unit 24 acquires the time information from the URL parameter, compares the time information with current time, and determines whether the elapsed time since the protected content C is previously acquired is within a predetermined time or not. The predetermined time is, for example, one hour. When the predetermined URL parameter does not exist (condition (1): No), the condition (2) is also determined as No.

Next, as a condition (3), the determination unit 24 determines whether the authenticated state is being continued or not, with reference to the session information. When the session information cannot be acquired, the condition (3) is determined as No.

Subsequently, the determination unit 24 determines whether to permit the display of the protected content C. When all conditions (1) to (3) are determined as Yes, the determination unit 24 determines to permit the display. When determining to permit the display of the protected content C, the determination unit 24 notifies the display control unit 22 to display the protected content C.

Next, the determination unit 24 subsequently determines whether to cancel the authenticated state. The determination unit 24 determines to cancel the authenticated state when condition (1): Yes and condition (2): No, or when condition (1): Yes and condition (3): No. When determining to cancel the authenticated state, the determination unit 24 notifies the cancellation unit 26 to cancel the authentication.

When the determination unit 24 determines not to permit the display of the protected content C, that is, when the determination result is "No" in any one of the conditions (1) to (3), the determination unit 24 rereads the protected content C. When the authenticated state is canceled, rereading is performed after waiting for the cancellation unit 26 to cancel the authenticated state. The determination unit 24 first notifies the setting unit 23 and resets (reconfigures) the display control information. When the display control information is reset, the determination unit 24 uses the URL provided with the URL parameter set by the setting unit 23 to request the server 100 to reread the protected content C, and the rereading is performed.

The above determination processing by the determination unit 24 is executed at each timing when the protected content C is read, when the detection unit 25 detects a change in a display state of the protected content C, and when the protected content C is continuously displayed for a certain period of time.

The detection unit 25 detects the change in the display state of the protected content C, and shifts the processing to processing of the determination unit 24 when the change in the display state is detected. The detection unit 25 detects the change in the display state by detecting a Visibility change message transmitted by the browser of the user terminal 1.

Here, the change in the display state means that the display state of the protected content C is switched between "displayed" and "hiding (not displayed)". Examples of cases where the display state changes include: when the protected content C is displayed again after the protected content C is minimized, when a tab of the protected content C is displayed again after another browser displays content different from the protected content C, and the like.

Examples of cases where the display state changes also include: when the protected content C is read after the protected content C is displayed and after the browser is closed and then restarted. When detecting that the protected content C is redisplayed, the detection unit 25 notifies the determination unit 24 of a determination request.

The cancellation unit 26 cancels the authenticated state of the protected content C when the determination unit 24 determines to cancel the authenticated state. The cancellation unit 26 cancels the authenticated state by deleting the authentication information held by the browser. Specifically, the cancellation unit 26 cancels the authenticated state by intentionally causing the authentication to fail.

For example, the authenticated state is cancelled by attempting the authentication using the authentication information of a dummy user who does not exist in the server 100. In this case, a predetermined user name may be set as the dummy user in advance so that the user name cannot be used for user registration. When the content is protected by authentication other than basic authentication, logout may be forcibly performed.

When the authenticated state of the protected content C is cancelled, the cancellation unit 26 requests the setting unit 23 to set the display control information of the protected content C. Thereby, the setting unit 23 sets the predetermined variable in the Cookie of the browser, and sets the current time in the time information of the URL parameter.

When the display control information is set, the setting unit 23 requests the display control unit 22 to read the protected content C by the set URL. Thereby, the display control unit 22 reads the protected content C based on the URL for which the new URL parameter is set, in a state where the authenticated state of the protected content C is cancelled.

In the present embodiment, the read protected content C is set to be in the hiding state in an initial state. The protected content C is displayed only when the determination unit 24 determines to permit the display.

Therefore, even the protected content C read from a cache is not displayed in the initial state. As when time has elapsed since the previous display as in the condition (2) and when the authentication is interrupted as in the condition (3) in the determination unit 24, If one does not want to display the protected content C, the protected content C will be reread without being permitted to display.

Since the URL during rereading is different from the original URL, the previous cache data is not used again. Thereby, when the display state changes, even if the cache data exists, the protected content C can be prevented from being displayed in an unintended state, and the protected content C can be appropriately protected.

Figure 4:
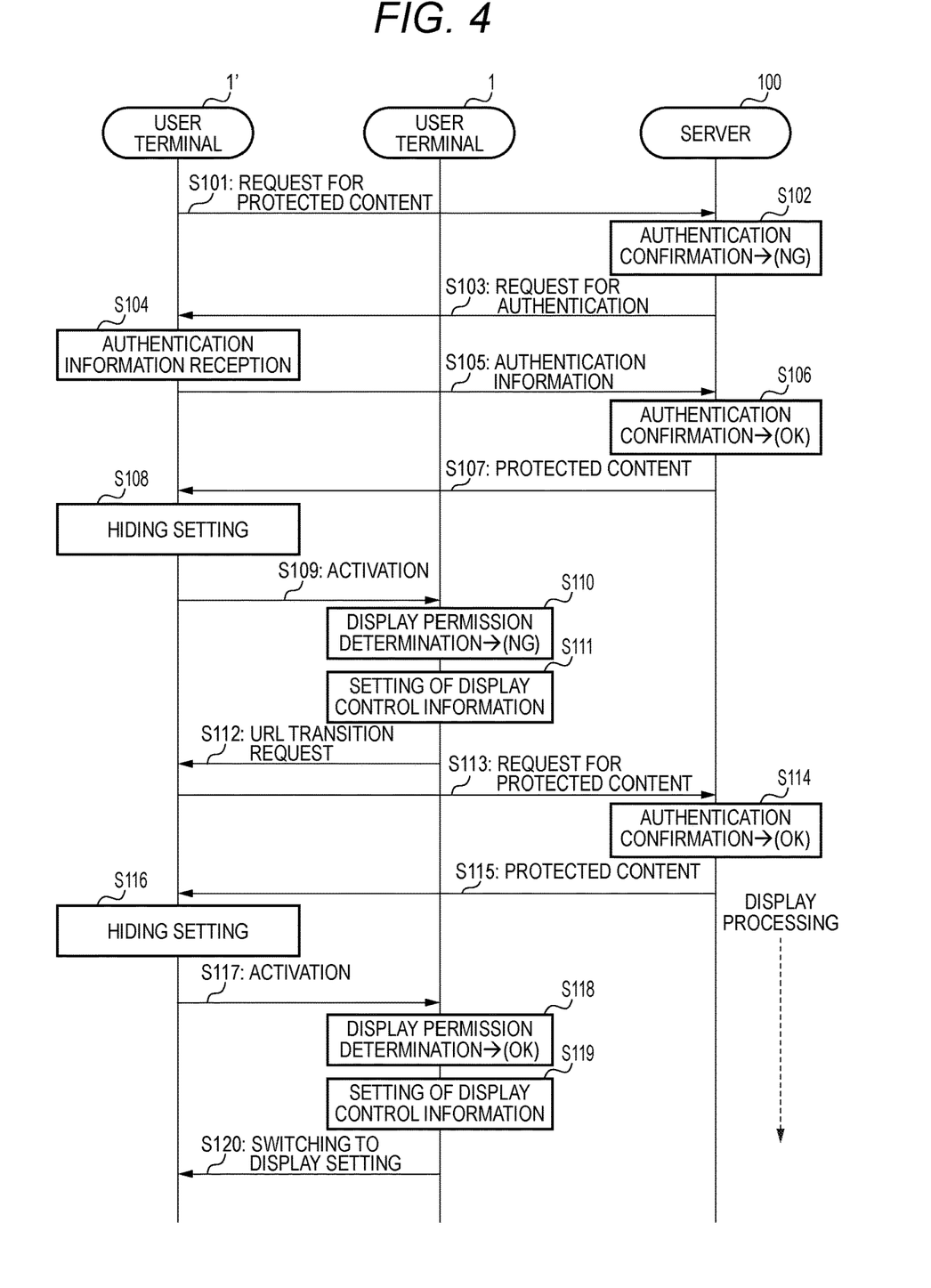
FIG. 4 is a flowchart (part 1) showing processing procedures executed by the user terminal.
Figure 5:
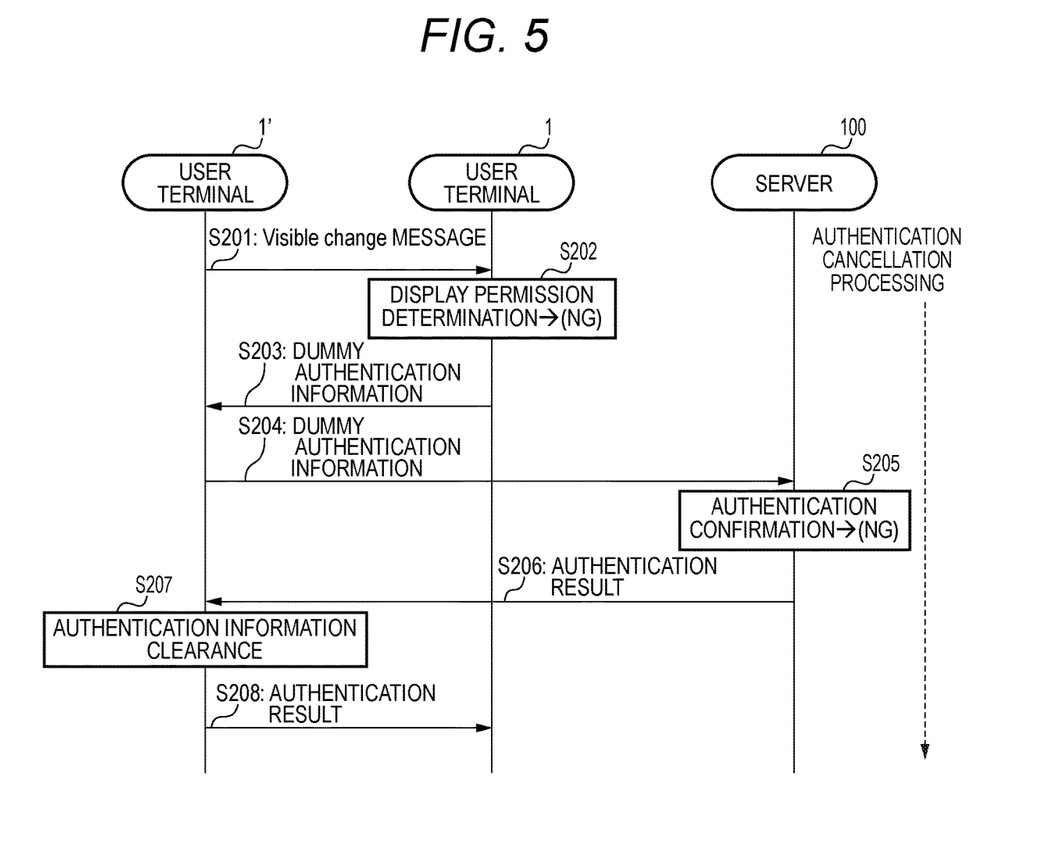
FIG. 5 is a flowchart (part 2) showing processing procedures executed by the user terminal.

Subsequently, processing procedures executed by the user terminal 1 according to the embodiment will be described with reference to FIGS. 4 and 5. FIGS. 4 and 5 are flowcharts showing the processing procedures executed by the user terminal 1. Hereinafter, the processing performed by the browser of the user terminal 1 will be described as processing of a user terminal 1', and the processing based on the display control program according to the embodiment of the user terminal 1 will be described as processing of the user terminal 1.

First, a series of processing procedures executed by the user terminal 1 will be described with reference to FIG. 4. As shown in FIG. 4, when the user terminal 1' transmits a request for the protected content C to the server 100 based on a user operation or the like (step S101), the server 100 performs authentication confirmation (step S102).

Here, since the server 100 has not acquired authentication information together with the request from the user terminal 1', a result of the authentication confirmation in step S102 is NG. Subsequently, the server 100 transmits a request for authentication of the protected content C to the user terminal 1' (step S103), and the user terminal 1' receives the authentication information from the user (step S104).

Subsequently, when the user terminal 1' transmits the authentication information received in step S104 to the server 100 (step S105), the server 100 performs the authentication confirmation based on the authentication information (step S106). For convenience of explanation, the following description will be continued assuming that the result of the authentication confirmation here is OK.

Subsequently, the server 100 transmits the protected content C to the user terminal 1' (step S107), and the user terminal 1' sets the protected content C to a hiding state (step S108) and then activates the user terminal 1 (step S109).

When activated, the user terminal 1 performs display permission determination based on display control information of the protected content C (step S110). Since the display control information is not set in determination in step S110, a determination result is NG.

Subsequently, the user terminal 1 newly sets the display control information (step S111), transmits a URL transition request to the user terminal 1' (step S112), and the user terminal 1' transmits the request for the protected content C to the server 100 (step S113). The authentication information and a URL parameter are added to the request here.

Thereafter, the server 100 performs the authentication confirmation based on the authentication information and the URL parameter (step S114). Here, for convenience of explanation, it is assumed that the result of the authentication confirmation is OK.

Then, the server 100 transmits the protected content C to the user terminal 1' (step S115), and the user terminal 1' sets the protected content C to hiding setting (step S116) and then activates the user terminal 1 (step S117).

The user terminal 1 performs the display permission determination (step S118) and setting of the display control information (step S119), and then switches a display attribute of the protected content C from hiding to display (step S120). Thereafter, the user terminal 1', the user terminal 1 and the server 100 repeatedly execute the display processing from step S116 onward each time the protected content C of the user terminal 1' is acquired.

Next, a series of processing procedures based on a change in a display state of the protected content C will be described. First, when the user terminal 1' transmits a Visible change message associated with redisplay of the protected content C to the user terminal 1 (step S201), the user terminal 1 performs display permission determination (step S202).

Here, for example, it is assumed that a predetermined time or more has elapsed since display of the previous protected content C until the redisplay, and description is continued assuming that a determination result of step S202 is NG.

Subsequently, the user terminal 1 transmits dummy authentication information for cancelling authentication to the user terminal 1' (step S203), and the user terminal 1' transmits the dummy authentication information to the server 100 (step S204).

The server 100 performs authentication confirmation based on the dummy authentication information (step S205). Here, in determination of step S205, since the authentication confirmation is performed based on the dummy authentication information, a result of the authentication confirmation is always NG.

When the user terminal 1' acquires the authentication result of NG from the server 100 (step S206), the user terminal 1' clears authentication information up to now (step S207) and notifies the user terminal 1 of the authentication result acquired from the server 100 (step S208).

Thereafter, the user terminal 1', the user terminal 1 and the server 100 are shifted to the processing from step S111 onward shown in FIG. 4. Also, even when a cache of the protected content C is reread, the user terminal 1' and the user terminal 1 perform authentication cancellation processing from step S202 onward shown in FIG. 5.

As described above, the display control program according to the embodiment causes the computer to execute a setting procedure for setting the display control information of the protected content C to be protected based on the authentication information, and a determination procedure for determining whether to permit display of the protected content C and whether to cancel the authenticated state of the protected content C based on the display control information set by the setting procedure. Therefore, according to the display control program according to the embodiment, the content can be appropriately protected.

Additional effects and modifications may be easily derived by those skilled in the art. Therefore, broader aspects of the present invention are not limited to the specific details and the representative embodiment that are shown and described above. Accordingly, various modifications may be attained without departing from the spirit or the scope of the general inventive concept as defined by the appended claims and equivalents thereof.

Further, the "unit" described above can be read as "means", "circuit" or the like. For example, the acquisition unit 21 can be read as an acquisition means or an acquisition circuit.

REFERENCE SIGN LIST 1 user terminal (one example of computer)
10 communication unit
20 control unit
21 acquisition unit
22 display control unit
23 setting unit
24 determination unit
25 detection unit
26 cancellation unit
100 server
C protected content

What is claimed is:

1. A non-transitory computer readable medium storing a display control program, the program causing a computer to execute:
   displaying content acquired from a server in a case where basic authentication of the server has been passed; and
   in a case where a predetermined time has elapsed after an acquisition of the content, performing a processing of canceling the basic authentication of the server by attempting a dummy authentication by sending a dummy user name, which is set for the canceling, to the server, and after performing the processing of canceling the basic authentication of the server, rewriting cache data for displaying the content.

2. The non-transitory computer readable medium according to claim 1, wherein the rewriting of the cache data is rewriting to a URL of a new content.

3. The non-transitory computer readable medium according to claim 1, wherein the program causes the computer to further execute:
   displaying a screen for inputting a user name for the basic authentication after the performing the processing of canceling the basic authentication.

4. A display control method to be executed by a computer caused by a display control program, the method comprising:
   displaying content acquired from a server in a case where basic authentication of the server has been passed; and
   in a case where a predetermined time has elapsed after an acquisition of the content, performing a processing of canceling the basic authentication of the server by attempting a dummy authentication by sending a dummy user name, which is set for the canceling, to the server, and after performing the processing of canceling the basic authentication of the server, rewriting cache data for displaying the content.

* * * * *